(12) United States Patent
Baury et al.

(10) Patent No.: US 11,260,990 B2
(45) Date of Patent: Mar. 1, 2022

(54) NAVAL PLATFORM PROVIDED WITH A ZONE FOR THE DECK LANDING/TAKE-OFF OF AT LEAST ONE AIRCRAFT AND DOLLY-TYPE MEANS FOR HANDLING SAID AIRCRAFT

(71) Applicant: NAVAL GROUP, Paris (FR)

(72) Inventors: Alexandre Baury, Ruelle sur Touvre (FR); Pierre Raspic, Ruelle sur Touvre (FR); Solange Cellario, Ruelle sur Touvre (FR)

(73) Assignee: NAVAL GROUP, Paris (FR)

( * ) Notice: Subject to any disclaimer, the term of this patent is extended or adjusted under 35 U.S.C. 154(b) by 272 days.

(21) Appl. No.: 16/465,759

(22) PCT Filed: Nov. 29, 2017

(86) PCT No.: PCT/EP2017/080779
§ 371 (c)(1),
(2) Date: May 31, 2019

(87) PCT Pub. No.: WO2018/099948
PCT Pub. Date: Jun. 7, 2018

(65) Prior Publication Data
US 2019/0389597 A1    Dec. 26, 2019

(30) Foreign Application Priority Data
Dec. 1, 2016    (FR) ...................................... 16/01701

(51) Int. Cl.
*B64F 1/12*    (2006.01)
*B63B 35/50*    (2006.01)
*B64F 1/00*    (2006.01)

(52) U.S. Cl.
CPC .............. *B64F 1/125* (2013.01); *B63B 35/50* (2013.01); *B64F 1/007* (2013.01)

(58) Field of Classification Search
CPC .. B64F 1/125; B64F 1/007; B64F 1/04; B64F 1/12; B63B 35/50; B62D 49/0621
See application file for complete search history.

(56) References Cited

U.S. PATENT DOCUMENTS 1,373,343 A * 3/1921 Masterman ............... B64F 1/14
244/115
3,116,897 A * 1/1964 Theed ..................... B64C 25/32
244/17.17

(Continued)

FOREIGN PATENT DOCUMENTS

| GB | 23640 A | 8/1907 |
|---|---|---|
| GB | 1 533 714 A | 11/1978 |

(Continued)

OTHER PUBLICATIONS

International Search Report, dated Feb. 6, 2018, from corresponding PCT/EP2017/080779 application.

*Primary Examiner* — Medhat Badawi
*Assistant Examiner* — Vicente Rodriguez
(74) *Attorney, Agent, or Firm* — Nixon & Vanderhye

(57) ABSTRACT

Disclosed is a naval platform equipped with a deck-landing/takeoff zone for at least one aircraft and dolly-type mechanism for handling the aircraft to move it over the deck-landing/takeoff zone. The dolly-type mechanism includes a vacuum disc for immobilizing the dolly and thereby securing the aircraft in position on the deck-landing/takeoff zone, the operation of which is triggered by an analyzer of the behavior of the platform in order to avoid any risk of uncontrolled movement of the aircraft.

13 Claims, 3 Drawing Sheets

(56) References Cited

U.S. PATENT DOCUMENTS

| | | | | | |
|---|---|---|---|---|---|
| 3,209,849 | A | * | 10/1965 | Gondert | ............ B62D 49/0621 |
| | | | | | 180/164 |
| 4,174,081 | A | | 11/1979 | Sardanowsky | |
| 4,786,014 | A | * | 11/1988 | Pesando | .................... B64F 1/12 |
| | | | | | 244/115 |
| 4,890,802 | A | * | 1/1990 | Burgess | ................. B64F 1/125 |
| | | | | | 244/100 R |
| 6,176,671 | B1 | | 1/2001 | Ortelli | |
| 8,051,791 | B2 | * | 11/2011 | Hovland | ................ B63B 35/50 |
| | | | | | 114/261 |
| 10,093,396 | B2 | * | 10/2018 | Besenzoni | ............... B64F 1/00 |

FOREIGN PATENT DOCUMENTS

| | | |
|---|---|---|
| WO | 20130132114 A1 | 9/2013 |
| WO | 2016/155883 A1 | 10/2016 |

* cited by examiner

NAVAL PLATFORM PROVIDED WITH A ZONE FOR THE DECK LANDING/TAKE-OFF OF AT LEAST ONE AIRCRAFT AND DOLLY-TYPE MEANS FOR HANDLING SAID AIRCRAFT

BACKGROUND OF THE INVENTION

The present invention relates to a naval platform.

More specifically, the invention relates to a naval platform equipped with a deck-landing/takeoff zone for at least one aircraft.

Such naval platforms are for example made up of surface vessels such as corvettes, frigates or projection buildings, or even aircraft carriers.

Of course, other platforms, such as offshore oil platforms or the like, equipped with zones for receiving helicopters, can also be considered.

Traditionally, these platforms are also equipped with means in truck form for handling the aircraft to move it on the platform.

Thus for example, and in the case where the platform is made up of a corvette or a frigate, such industrial truck means are used for example to move a helicopter, between the deck-landing/takeoff zone of the platform and a storage hangar thereof, provided near said zone on said platform.

Many industrial trucks-type have already been proposed for this type of application in the state of the art.

These generally include energy storage means, motor means and means for coupling to the aircraft, allowing an operator to grasp and move the aircraft.

However, these industrial truck means have a certain number of drawbacks in the considered application on board such a platform.

Indeed and for various operational reasons, it must be possible to move the aircraft, and in particular a helicopter, on such a platform, on heavy and even very heavy seas, and in violent winds.

The platform is then subject to relatively significant movements, reflected by risks of uncontrolled movements of the aircraft on the platform and more particularly on the deck-landing/take off zone.

The aircraft may in fact experience forces causing total or partial slippage, or even tilting thereof.

It is easy to imagine the repercussions of such a loss of control of the aircraft not only for its structure and that of the platform, but also for the operators on board, and in particular the staff assigned to the aviation part of the platform.

SUMMARY OF THE INVENTION

The invention therefore aims to resolve these problems.

To that end, the invention relates to a naval platform equipped with a deck-landing/takeoff zone for at least one aircraft and dolly-type means for handling said aircraft to move it over said deck-landing/takeoff zone, characterized in that the dolly-type means include means forming a vacuum disc for immobilizing the dolly and thereby securing the aircraft in position on the deck-landing/takeoff zone, the operation of which is triggered by means for analyzing the behavior of the platform in order to avoid any risk of uncontrolled movement of the aircraft.

The platform according to the invention may include one or more of the following features, considered alone or according to any technically possible combination(s):

- the means for analyzing the movements of the platform include means for measuring the roll, pitch, yaw and/or heave movements of the platform in order to detect any slippage and/or tilting movements of the aircraft and to trigger the operation of the vacuum disc means;
- the vacuum disc means include a support plate provided with a layer of adhesive and bearing material on the platform and associated with means for actuating and deploying the latter, from a retracted position allowing the movement of the aircraft toward an inactive position for immobilizing and securing the latter;
- the plate means comprise plate portions articulated on one another;
- the plate means comprise fastening means articulated on the rest of the dolly through ball joint means;
- the vacuum disc means are connected to means for generating an air space between them and the platform, in the immobilization position of the aircraft;
- a plurality of suction ducts are provided extending between the vacuum disc means and the vacuum generating means;
- the actuating and deployment means of the vacuum disc means comprise cylinders;
- it includes a storage hangar for the aircraft and the dolly means are suitable for moving said aircraft between said hangar and the deck-landing/takeoff zone;
- the deck-landing/takeoff zone is equipped with a harpoon grate for the aircraft.

BRIEF DESCRIPTION OF THE DRAWINGS

The invention will be better understood using the following description, provided solely as an example and done in reference to the appended drawings, in which.

DETAILED DESCRIPTION OF THE PREFERRED EMBODIMENTS

Figure 1:
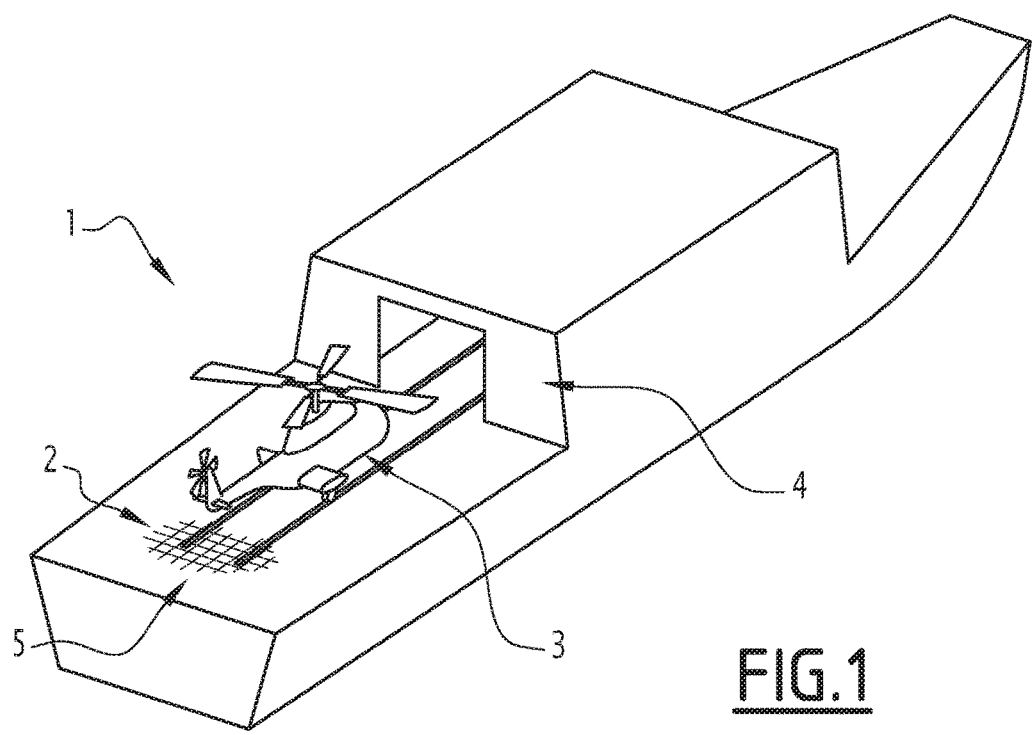
FIG. 1 shows a partial perspective view of one example embodiment of a naval platform according to the invention, equipped with a deck-landing/takeoff zone of an aircraft and a hangar.

These figures, and in particular in FIG. 1, show a naval platform designated by general reference 1.

In the example embodiment illustrated in this FIG. 1, the naval platform 1 is made up of a surface building, such as a corvette or a frigate.

Of course and as previously indicated, other examples of platforms can be considered.

In the described example, the naval platform 1 therefore includes, in its rear part, a deck landing/takeoff zone, designated by general reference 2, for an aircraft, designated by general reference 3, made up, in the described example, of a rotary-wing aircraft such as a helicopter.

The platform 1 is also provided, in the described example, with a storage hangar 4 for this helicopter near this deck-landing/takeoff zone 2.

It will also be noted that the deck-landing/takeoff zone 2 of the platform 1 may for example be equipped with a harpoon grate for the aircraft 3.

This grate is designated by general reference 5 in this figure.

The structure of this grate 5 and that of the harpoon means of the helicopter being well known in the state of the art, they will not be described in more detail hereinafter.

It will simply be noted that this grate 5 is suitable for example for receiving a harpoon carried by the helicopter in order to secure the position thereof on the platform 1, and more particularly above said grate.

As previously stated, the helicopter must be able to be moved between the takeoff/deck-landing zone 2 and the hangar 4 of the platform 1.

To that end, dolly means for handling the aircraft 3 are used to move it.

Such means are in fact made available to the on-board staff to assist them during these maneuvers.

Figure 2:
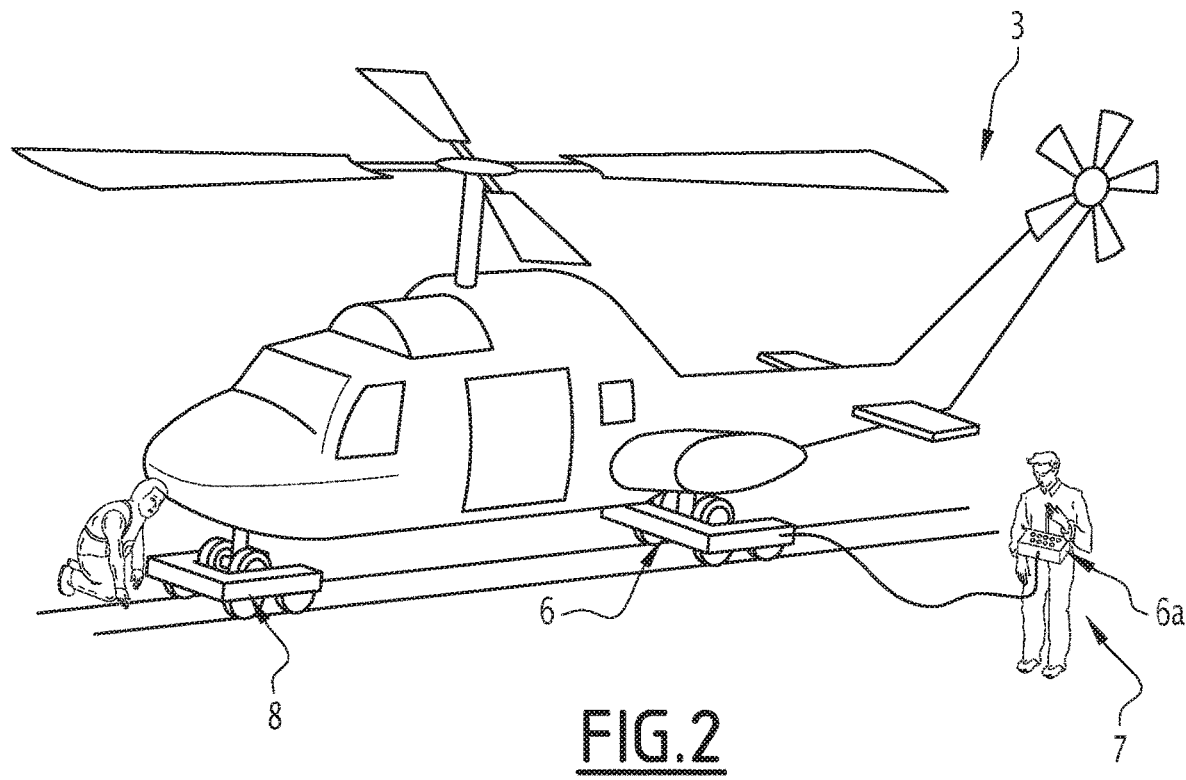
FIG. 2 depicts an example embodiment of dolly means of such an aircraft, included in the makeup of a platform according to the invention, and FIGS. 3, 4, 5 and 6 schematically illustrate the structure and operation of vacuum disc means included in the composition of such a dolly.

FIG. 2 shows an example embodiment of one such dolly.

In this FIG. 2, the aircraft is still designated by general reference 3, and the dolly means of said aircraft 3 are designated by general reference 6.

Said dolly 6 is, as previously stated, equipped with means making it possible to grasp the aircraft 3, for example at its main landing gear.

This dolly is also equipped with energy storage means and motor means allowing an operator to steer it in order to move the aircraft 3.

To that end, said dolly 6 may for example be operated remotely by an operator designated by general reference 7 in this FIG. 2, to control its movements in the deck-landing/takeoff zone 2, for example using a remote control unit 6a provided to him.

This unit then includes control members allowing the operator to control the dolly and its various equipment remotely.

In the example embodiment illustrated in this FIG. 2, a support dolly 8 for the nose gear part and, in the illustrated example, nose wheels of the helicopter, can also be used to facilitate the maneuver.

One can then see that the operator 7 is capable of controlling the movements of the dolly means 6 to move the aircraft 3 of the deck-landing/takeoff zone 2 of the platform 1, to move said aircraft, for example, to and from the storage hangar 4.

However and as previously stated, this must be able to be done under any weather conditions and in particular when the sea is heavy and there is wind.

As also previously stated, the handling of these aircraft 3 under these conditions then presents a certain number of risks not only for the operators, but also for the equipment.

To that end and to resolve these problems, the dolly means 6 included in the composition of the platform 1 according to the invention include vacuum disc means for immobilizing said dolly 6 and therefore securing the aircraft 3 in position on the deck-landing/takeoff zone 2, the operation of which is triggered by means for analyzing the behavior of the platform 1 in order to avoid any risk of uncontrolled movement of the aircraft 3.

These means for analyzing the movements of the platform 1 include means for measuring the roll, pitch, yaw and/or heave movements of the platform 1 in order to detect any slippage and/or tilting movements of the aircraft 3 and to trigger the operation of the vacuum disc means.

Owing to such a structure, one then detects when the aircraft 3 leaves its movement safety domain on the platform 1, to trigger the operation of the means for securing the latter in order to immobilize it and avoid any risk of slippage and/or tilting.

FIGS. 3 to 6 show the structure and the operation of one example embodiment of such vacuum disc means included in the composition of such a dolly 6.

Said vacuum disc means are designated by general reference 9 in these figures.

In these FIGS. 3 to 6, the means for analyzing the behavior of the platform 1 are designated by general reference 10.

As previously indicated, these means 10 for example comprise means making it possible to measure the roll, pitch, yaw and/or heave movements of the platform 1 in order to detect any slippage and/or tilting movements of the aircraft 3, to trigger the operation of the vacuum disc means 9 and to secure the position of the aircraft.

Such means being known elsewhere, they will not be described in more detail hereinafter.

The vacuum disc means 9 in turn comprise a support plate that is designated by general reference 11 in these FIGS. 3 to 6.

This support plate 11 is provided on its face turned toward the platform with a layer of adhesive and bearing material on said platform, designated by general reference 12.

In these FIGS. 3 to 6, the platform and its deck-landing/takeoff zone are still designated by references 1 and 2, respectively.

Figure 3:
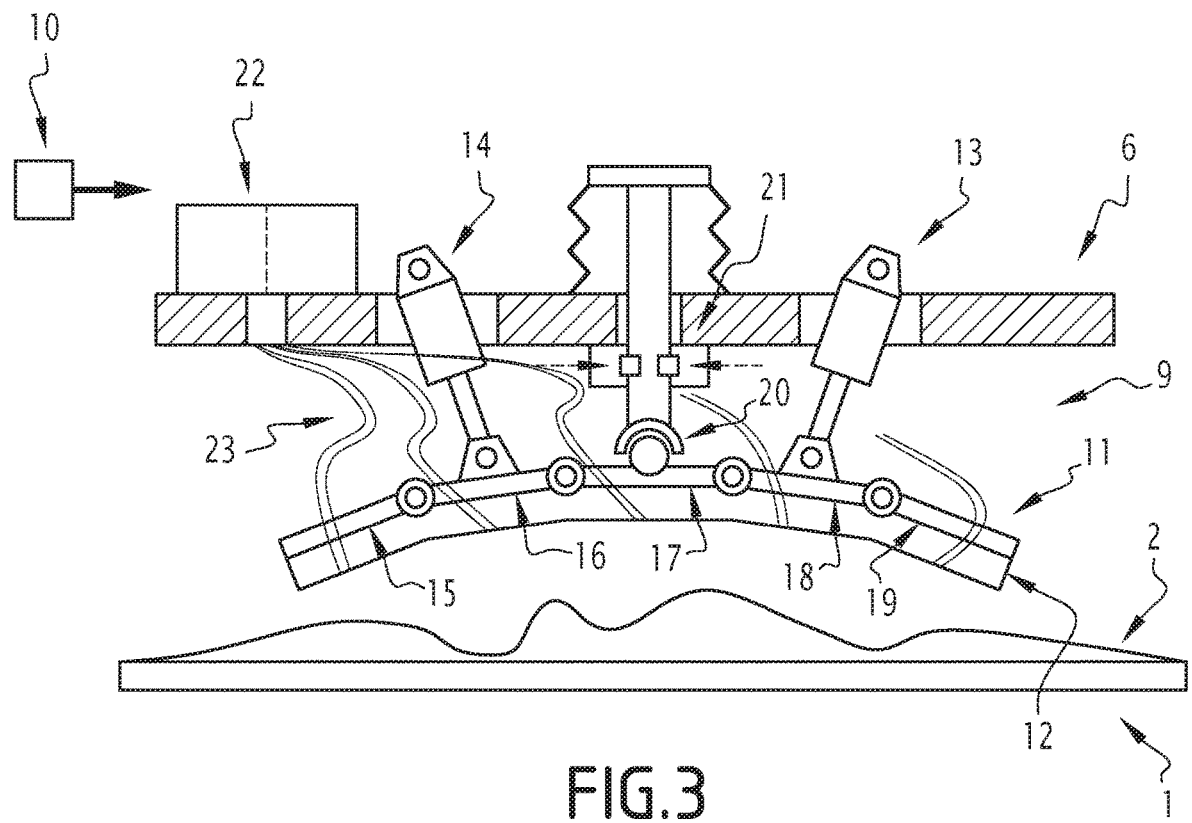
Figure 4:
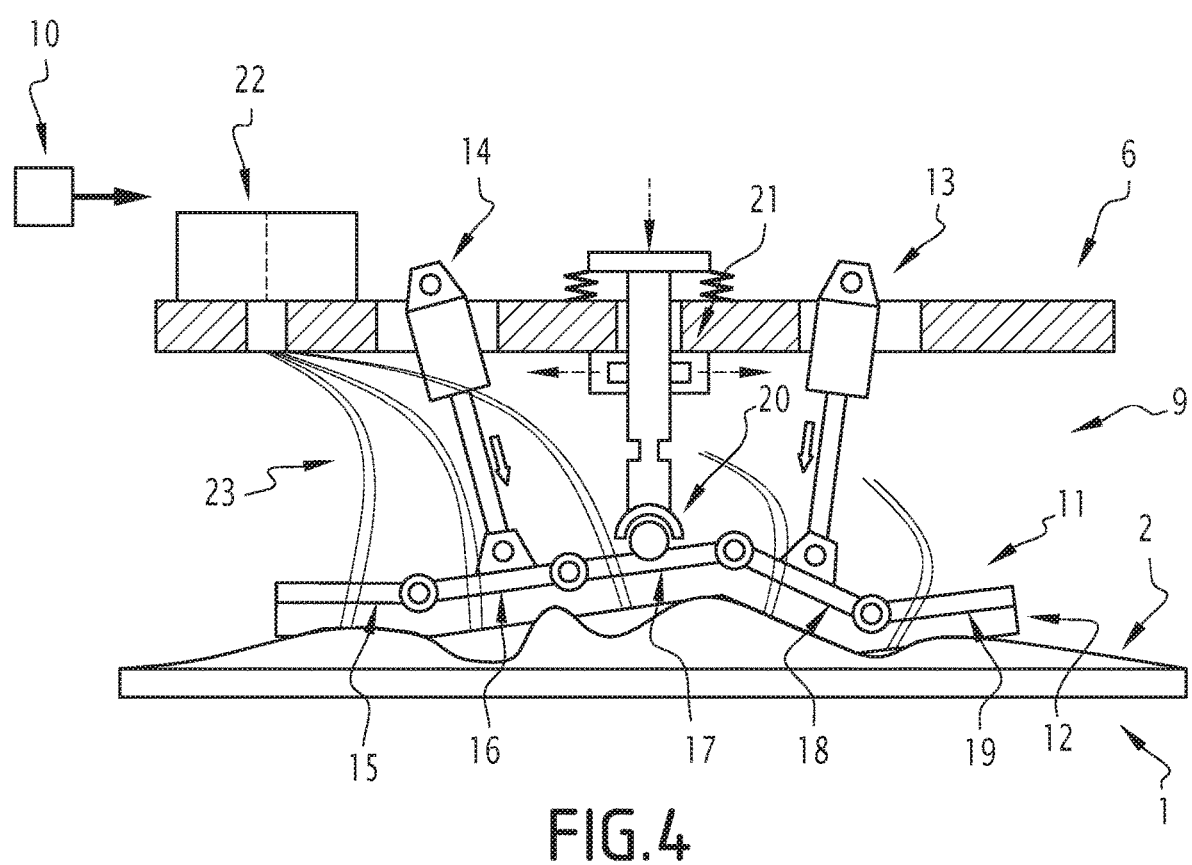
Figure 5:
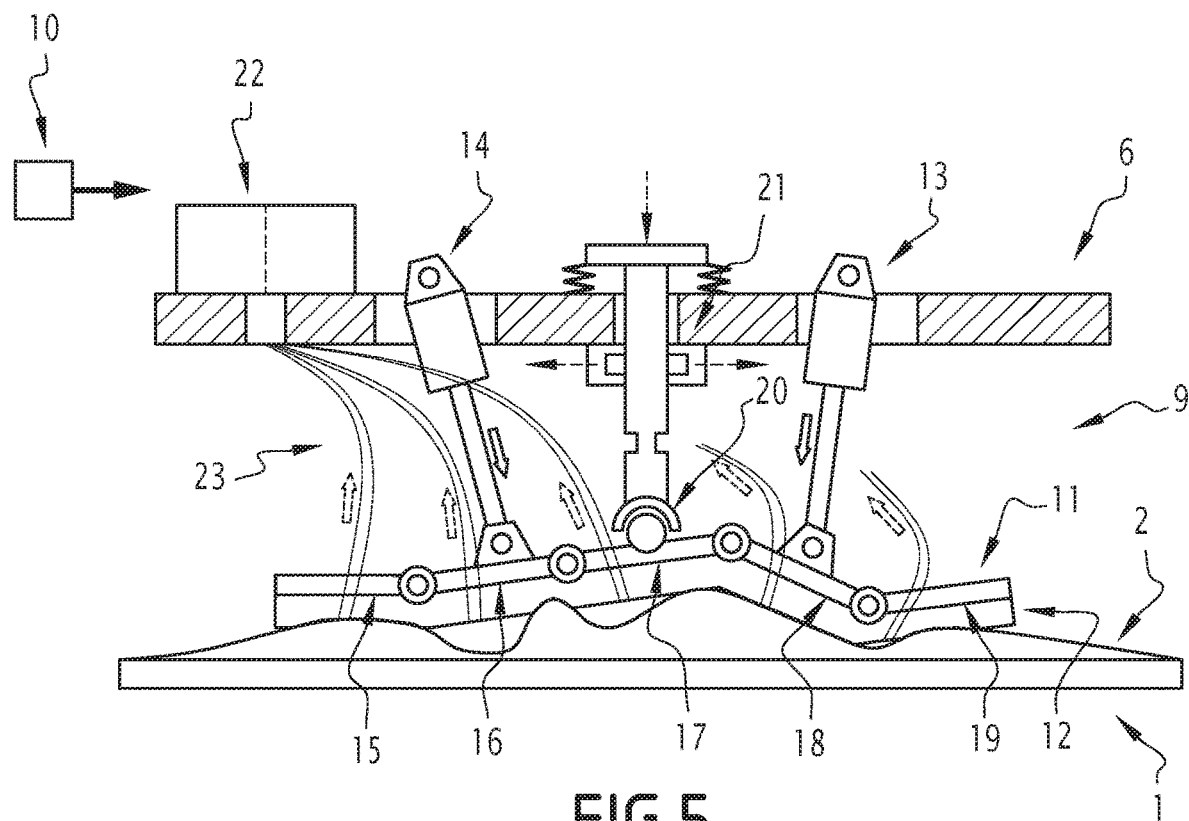
Figure 6:
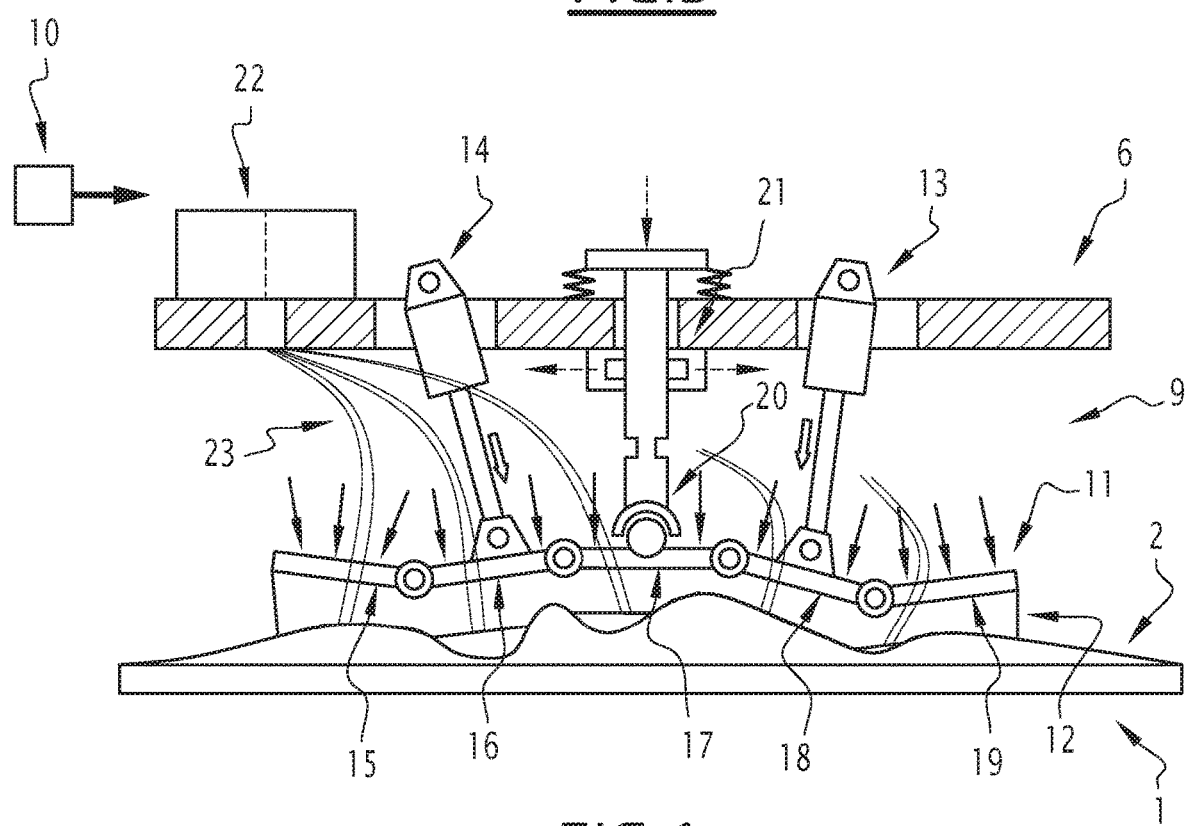

The support plate 11 of the vacuum disc means 9 is also associated with means for actuating and deploying the latter, making it possible to move them between a retracted position allowing the movement of the aircraft 3, illustrated in FIG. 3, and an active position for immobilizing and securing the aircraft 3 on the platform 1, illustrated in FIG. 5.

Said actuating and deployment means are designated by references 13 and 14 in these figures and for example comprise actuating cylinders.

As also illustrated in these figures, the support plate 11 is in fact made up of an assembly of plate portions articulated on one another.

In the example illustrated in these figures, five plate portions 15, 16, 17, 18 and 19 are respectively illustrated and are articulated on one another, to form the plate 11.

Of course, a different number of plate portions can be considered and different embodiments of the means for articulating the plate portions to one another can be considered.

This then makes it possible, as illustrated, for this support plate 11 to deform to marry the shape of the platform 1 and more particularly of the deck-landing/takeoff zone 2 thereof.

As also illustrated, the support plate 11, and in the described example the central plate portion 17 thereof, is articulated on the rest of the dolly 6 through articulated ball joint fastening means.

These ball joint means are designated by general reference 20 and may have any appropriate structure.

Note will also be made, as illustrated, of the presence of means for locking the vacuum disc means 9 in the retracted position.

These locking means are designated by general reference 21 in these figures and are for example intended to keep the support plate 11 in the retracted position, as long as the triggering of the vacuum disc means 9 is not commanded.

These locking means also have any appropriate structure, for example with electric, pneumatic or hydraulic command.

It should also be noted that the vacuum disc means 9 are connected to means for generating an air space between them and more particularly the bearing layer 12 and the platform 1, in the immobilization position of the aircraft 3.

Said means are for example designated by general reference 22 in said figures.

Several suction ducts, like for example that designated by general reference 23, are then provided between said vacuum generating means 22 and the vacuum disc means 9.

Indeed, such a duct 23 can be provided between the vacuum generating means 22 and each of the portions of the support plate 11.

These vacuum generating means 22 are then suitable for suctioning the air between the layer of adhesive material 12 of the support plate 11 and the platform 1, in order to further improve the immobilization of the dolly 6 and therefore of the aircraft 3, in position.

These means 22 can also be used in the opposite direction, to inject air between the layer of adhesive material 12 and the platform 1 to facilitate the loosening of said vacuum disc means 9 from the platform.

The operation of such vacuum disc means 9 can then be described as follows.

The analysis means 10 detect any potentially dangerous situation for the aircraft 3, or for the operators 7 on board the platform 1.

This for example results from an analysis of the movements of the platform 1, this analysis being reflected by the emission of a signal triggering the vacuum disc means 9.

This triggering signal then makes it possible to unlock the locking means 21, to cause the power supply of the actuators 13 and 14 to press the support plate 11, and in particular the layer of adhesive and bearing material 12 thereof, on the platform 1.

The operation of the vacuum generating means 22 is also triggered to cause the suction of the air between said layer 12 and the platform 1, and to lock the vacuum disc means 9 and therefore the dolly 6 of the aircraft 3 in position.

This then makes it possible to secure the aircraft 3 in position in order to prevent any uncontrolled movement thereof and secure not only the equipment, but also the on-board personnel.

To loosen the vacuum disc means 9, it is then possible to proceed in the opposite direction, by injecting air between the layer of adhesive 12 of the support plate 11 and the platform 1, and to cause the support plate 11 to rise by activating the actuators 13 and 14, then locking the latter in position using the locking means 21.

One can then see that such a structure has a certain number of advantages, in particular in terms of the safety of the operators and the on-board equipment.

Indeed and once the analysis means 10 detect a potential risk, they trigger the securing means.

In the preceding description, the case of the use of dolly means 6 on a naval platform 1 has been illustrated, such as a surface vessel, to move a helicopter between the deck-landing zone 2 and a storage hangar 4.

As mentioned, other applications, for example to other platforms such as offshore platforms, and other aircraft such as rotary-wing drones or the like, can be considered.

Of course, other embodiments can be considered.

The invention claimed is:

1. A naval platform (1), comprising:
   a deck-landing/takeoff zone (2) for at least one aircraft (3);
   a dolly (6) for handling said aircraft (3) and moving said aircraft over said deck-landing/takeoff zone (2), the dolly (6) including a suction cup for immobilizing the dolly (6) and thereby securing the aircraft (3) in position on the deck-landing/takeoff zone (2); and
   an analyzing device configured to analyze a behavior of the platform (1) and to trigger the suction cup in order to avoid any risk of uncontrolled movement of the aircraft (3),
   wherein the suction cup includes a support plate (11), provided with a layer of adhesive and bearing material (12) on the platform (1) and associated with actuators configured to actuate and deploy the suction cup from a retracted position that permits movement of the aircraft (3) toward an inactive position that immobilizes and secures the aircraft, and
   wherein the support plate comprises plate portions articulated on one another.

2. The platform according to claim 1, wherein the analyzing device includes a measuring device configured to measure and of a roll, a pitch, a yaw and/or heave movements of the platform (1), in order to detect any slippage and/or tilting movements of the aircraft (3) and to trigger the suction cup.

3. The platform according to claim 1, wherein the support plate comprises fasteners articulated on the dolly (6) through a ball joint.

4. The platform according to claim 1, wherein the suction cup is connected to a vacuum generator configured to generate a vacuum between the suction cup and the platform (1) in an immobilization position of the aircraft (3).

5. The platform according to claim 4, wherein a plurality of suction ducts (23) are provided extending between the suction cup and the vacuum generator.

6. The platform according to claim 1, wherein the actuators comprise cylinders.

7. The platform according to claim 1, further comprising:
   a storage hangar (4) for the aircraft (3),
   wherein the dolly is configured to move said aircraft (3) between said storage hangar (4) and the deck-landing/takeoff zone (2).

8. The platform according to claim 7, wherein the deck-landing/takeoff zone (2) is equipped with a harpoon grate (5) for the aircraft (3).

9. The platform according to claim 2, wherein the suction cup is connected to a vacuum generator configured to generate a vacuum between the suction cup and the platform (1) in an immobilization position of the aircraft (3).

10. The platform according to claim 1, wherein the suction cup is connected to a vacuum generator configured to generate a vacuum between the suction cup and the platform (1) in the inactive position for immobilizing and securing the aircraft (3).

11. The platform according to claim 3, wherein the suction cup is connected to a vacuum generator configured to generate a vacuum between the suction cup and the platform (1) in the inactive position for immobilizing and securing the aircraft (3).

12. The platform according to claim 2, further comprising:
   a storage hangar (4) for the aircraft (3),
   wherein the dolly is configured to move said aircraft (3) between said storage hangar (4) and the deck-landing/takeoff zone (2).

13. The platform according to claim 3, further comprising:
   a storage hangar (4) for the aircraft (3),
   wherein the dolly is configured to move said aircraft (3) between said storage hangar (4) and the deck-landing/takeoff zone (2).

* * * * *